United States Patent
Wang et al.

(10) Patent No.: US 10,135,587 B2
(45) Date of Patent: Nov. 20, 2018

(54) MOBILE COMMUNICATION DEVICES AND METHODS FOR CONTROLLING WIRELESS TRANSMISSION AND RECEPTION

(71) Applicant: MediaTek Inc., Hsin-Chu (TW)

(72) Inventors: Chih-Yuan Wang, Hsinchu (TW); Cheng-Wei Liu, Hsinchu (TW); Wei-Shou Yang, Taoyuan (TW); Wei-Hsiang Cheng, Kaohsiung (TW); Ya-Ting Cho, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 114 days.

(21) Appl. No.: 14/618,238

(22) Filed: Feb. 10, 2015

(65) Prior Publication Data

US 2016/0233995 A1    Aug. 11, 2016

(51) Int. Cl.
  *H04W 4/00* (2018.01)
  *H04L 5/00* (2006.01)
  *H04L 25/02* (2006.01)
  *H04W 52/02* (2009.01)

(52) U.S. Cl.
  CPC ............ *H04L 5/0048* (2013.01); *H04L 5/006* (2013.01); *H04L 25/0224* (2013.01); *H04W 52/0245* (2013.01); *Y02D 70/00* (2018.01); *Y02D 70/1262* (2018.01); *Y02D 70/1264* (2018.01); *Y02D 70/146* (2018.01)

(58) Field of Classification Search
  None
  See application file for complete search history.

(56) References Cited

U.S. PATENT DOCUMENTS

| | | | | |
|---|---|---|---|---|
| 2005/0030927 A1* | 2/2005 | Mucke | ................... | H04L 5/023 370/336 |
| 2010/0284379 A1 | 11/2010 | Bitran et al. | | |
| 2011/0176466 A1 | 7/2011 | Lindoff et al. | | |
| 2011/0256893 A1* | 10/2011 | Athley | ................. | H04W 52/42 455/500 |

(Continued)

FOREIGN PATENT DOCUMENTS

| | | |
|---|---|---|
| EP | 2 388 958 | 11/2011 |
| EP | 2 526 629 | 11/2012 |
| WO | WO 2014/051478 | 4/2014 |

*Primary Examiner* — Anh Vu H Ly
(74) *Attorney, Agent, or Firm* — McClure, Qualey & Rodack, LLP

(57) ABSTRACT

A mobile communication device having a reception circuit, a transmission circuit, and a processing unit is provided. The reception circuit and the transmission circuit are configured to receive and transmit wireless signals, respectively. The processing unit activates the reception circuit for a portion of a downlink time interval for receiving Control Channel (CCH) data and one or more Reference Signal (RS) symbols or traffic data symbols beyond the CCH data, and deactivates the reception circuit for the remaining portion of the downlink time interval. Also, the processing unit activates the transmission circuit for a portion of an uplink time interval for transmitting traffic data, determines a radio signal quality with regard to the transmission of the traffic data, and deactivates the transmission circuit for the remaining portion of the uplink time interval when the radio signal quality exceeds a predetermined threshold.

10 Claims, 15 Drawing Sheets

(56) References Cited

U.S. PATENT DOCUMENTS

| | | | |
|---|---|---|---|
| 2013/0044713 A1* | 2/2013 | Suh | H04L 5/0048 |
| | | | 370/329 |
| 2013/0182599 A1 | 7/2013 | Bachl et al. | |
| 2015/0016323 A1* | 1/2015 | Sundararajan | H04W 52/0209 |
| | | | 370/311 |
| 2016/0043843 A1* | 2/2016 | Liu | H04L 5/0048 |
| | | | 370/329 |
| 2016/0226633 A1* | 8/2016 | Hu | H04L 1/22 |
| | | | 370/225 |

* cited by examiner

MOBILE COMMUNICATION DEVICES AND METHODS FOR CONTROLLING WIRELESS TRANSMISSION AND RECEPTION

BACKGROUND OF THE INVENTION

Field of the Invention

The invention generally relates to wireless communication transceivers, and more particularly to mobile communication devices and methods for controlling wireless transmission and reception with nano-deactivation of a reception circuit and/or a transmit circuit.

Description of the Related Art

In an Orthogonal Frequency Division Multiplex (OFDM) system, uplink/downlink signal transmission is made on a subframe basis and one subframe is defined by a certain time interval including a plurality of OFDM symbols. The Third Generation Partnership Project (3GPP) supports a type 1 radio frame structure applicable to Frequency Division Duplex (FDD), and a type 2 radio frame structure applicable to Time Division Duplex (TDD). Take the Long Term Evolution (LTE) technology as an example. As shown in FIG. 1, each LTE frame structure includes 10 subframes, and each subframe consists of 2 timeslots, each of which includes 6 or 7 OFDM symbols. The modulated symbols are constructed from a data packet and inserted into a rectangular grid of OFDM symbols in the time-frequency domain. This rectangular grid is further divided into the so-called "resource blocks," such that each resource block includes consecutive sub-carriers in the frequency domain and consecutive OFDM symbols in the time domain. An LTE resource block includes 12 consecutive sub-carriers in the frequency domain and a timeslot of 6 or 7 consecutive OFDM symbols in the time domain.

To coherently demodulate the symbols included in these resource blocks, an OFDM receiver must estimate the channel over which the resource blocks are received. To facilitate this estimation, Reference Signal (RS) symbols (also referred to as pilot symbols) are transmitted in each resource block. In the LTE technology, an RS may be a Cell-specific RS (CRS), a Multicast-Broadcast Single Frequency Network (MBSFN) RS, a User Equipment (UE)-specific RS associated with Physical Downlink Shared Channel (PDSCH), a De-Modulation (DM) RS associated with Enhanced Physical Downlink Control Channel (EPDCCH), a Positioning RS, or a Channel State Information (CSI) RS. Generally speaking, the response of the wireless channel in an OFDM system is a slow-varying, two-dimensional function of time and frequency. Accordingly, RS symbols need not be placed in every subcarrier nor in every OFDM symbol interval. Instead, RS symbols may be sparsely distributed across each resource block.

BRIEF SUMMARY OF THE INVENTION

In a first aspect of the invention, a mobile communication device comprising a reception circuit and a processing unit is provided. The reception circuit is configured to receive wireless signals. The processing unit is configured to activate the reception circuit for a portion of a downlink time interval for receiving Control Channel (CCH) data and one or more Reference Signal (RS) symbols or traffic data symbols beyond the CCH data, and deactivate the reception circuit for the remaining portion of the downlink time interval.

In a second aspect of the invention, a method for controlling wireless reception, executed by a mobile communication device comprising a reception circuit for receiving wireless signals is provided. The method comprises the steps of: activating the reception circuit for a portion of a downlink time interval for receiving Control Channel (CCH) data and one or more Reference Signal (RS) symbols or traffic data symbols beyond the CCH data; and deactivating the reception circuit for the remaining portion of the downlink time interval.

In a third aspect of the invention, a mobile communication device comprising a transmission circuit and a processing unit is provided. The transmission circuit is configured to transmit wireless signals. The processing unit is configured to activate the transmission circuit for a portion of an uplink time interval for transmitting traffic data, determine a radio signal quality with regard to the transmission of the traffic data, and deactivate the transmission circuit for the remaining portion of the uplink time interval when the radio signal quality exceeds a predetermined threshold, wherein the remaining portion comprises one or more traffic data symbols of the uplink time interval.

In a fourth aspect of the invention, a method for controlling wireless transmission, executed by a mobile communication device comprising a transmission circuit for transmitting wireless signals is provided. The method comprises the steps of: activating the transmission circuit for a portion of an uplink time interval for transmitting traffic data; determining a radio signal quality with regard to the transmission of the traffic data; and deactivating the transmission circuit for the remaining portion of the uplink time interval when the radio signal quality exceeds a predetermined threshold, wherein the remaining portion comprises one or more traffic data symbols of the uplink time interval.

Other aspects and features of the invention will become apparent to those with ordinary skill in the art upon review of the following descriptions of specific embodiments of the mobile communication devices and the methods for controlling wireless transmission and reception.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. Although the embodiments are described in the context of the Long Term Evolution (LTE) technology, those skilled in the art will appreciate that these embodiments may be readily adapted to other wireless technologies, standards, and systems (e.g., Worldwide Interoperability for Microwave Access (WiMAX), Time-Division LTE (TD-LTE), and LTE-Advanced, etc.) in which RS symbols are distributed across time and/or frequency domain. It should be understood that the embodiments may be realized in software, hardware, firmware, or any combination thereof.

Figure 1:
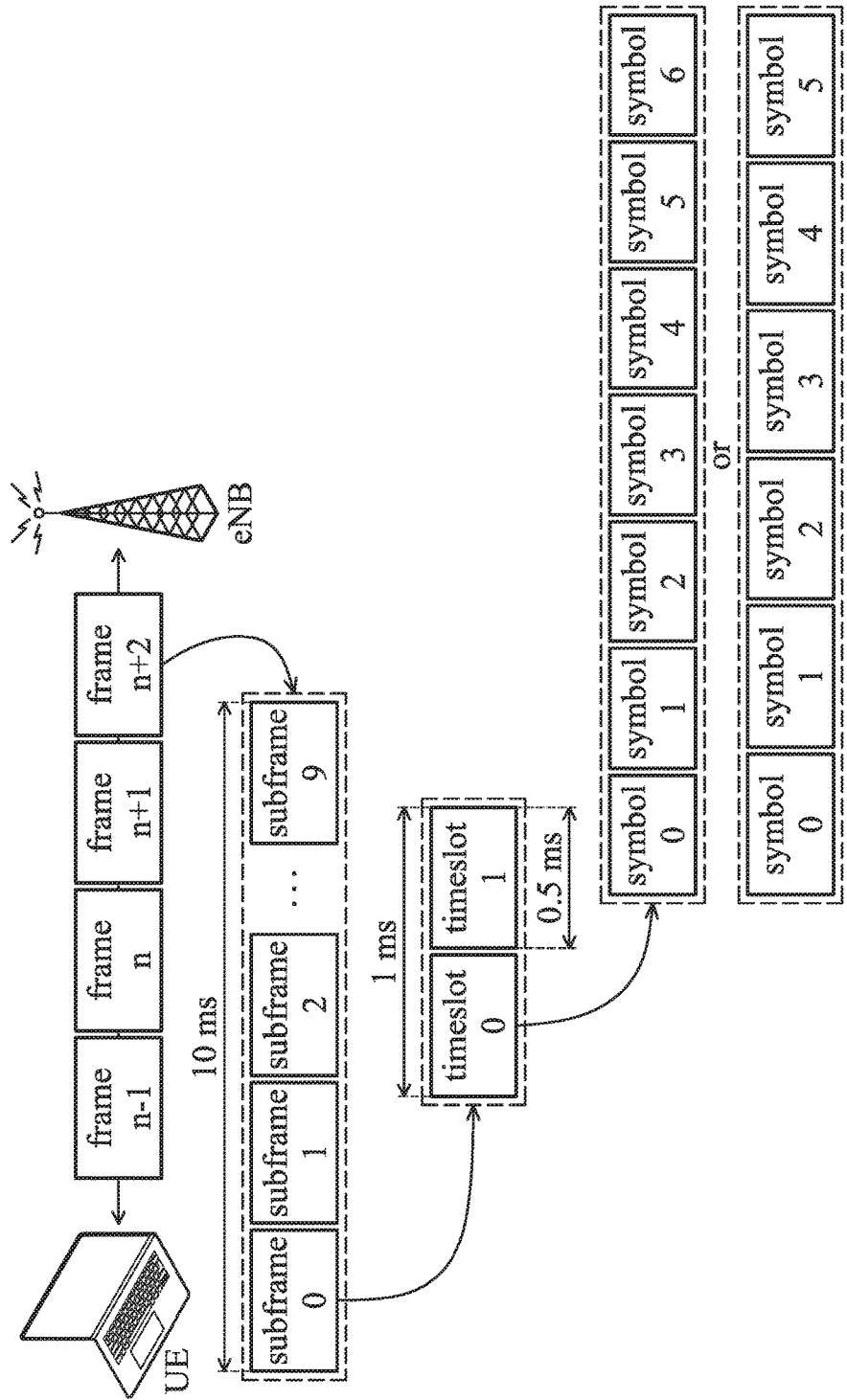
FIG. 1 is a schematic diagram illustrating the frame structure for the Long Term Evolution (LTE) technology.
Figure 2:
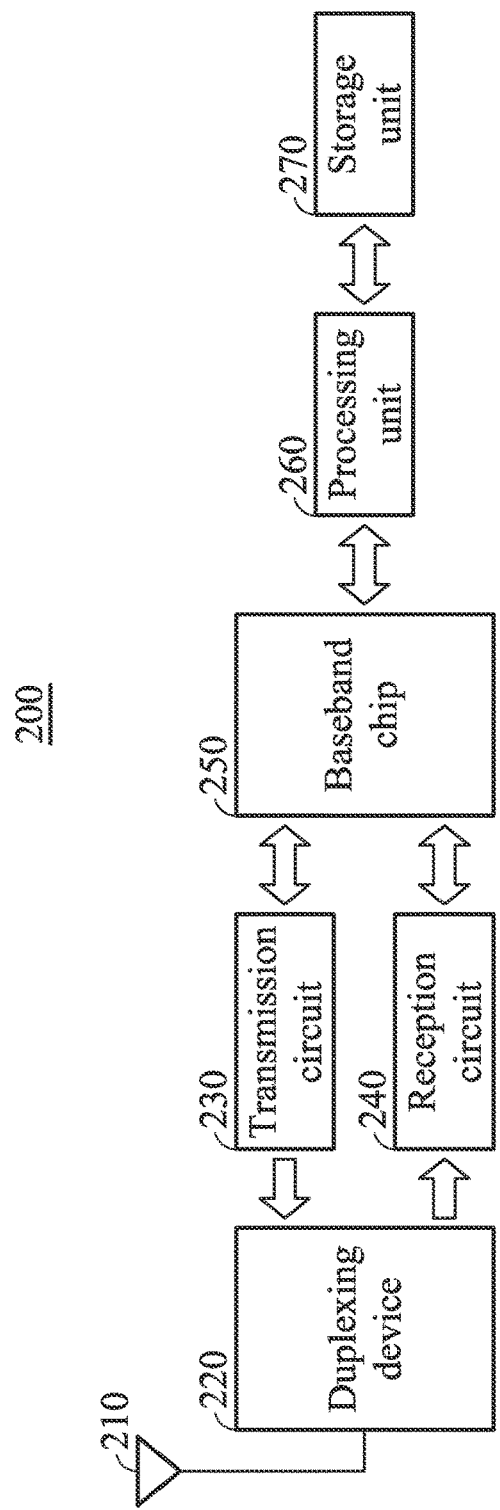
FIG. 2 is a schematic diagram illustrating a mobile communication device according to an embodiment of the invention.

FIG. 2 is a schematic diagram illustrating a mobile communication device according to an embodiment of the invention. The mobile communication device 200 comprises an antenna 210, a duplexing device 220, a transmission circuit 230, a reception circuit 240, a baseband chip 250, a processing unit 260, and a storage unit 270. The antenna 210 may be an antenna system including one or more physical antennas, and is coupled through the duplexing device 220 to the transmission circuit 230 and the reception circuit 240. The baseband chip 250 may contain hardware components to perform baseband signal processing, including Analog-to-Digital Conversion (ADC)/Digital-to-Analog Conversion (DAC), gain adjusting, modulation/demodulation, encoding/decoding, and so on. The transmission circuit 230 is responsible for receiving baseband signals from the baseband chip 250 and converting the received baseband signals to Radio Frequency (RF) wireless signals which are later transmitted via the antenna 210 and the duplexing device 220. The reception circuit 240 is responsible for receiving RF wireless signals via the antenna 210 and the duplexing device 220, converting the received RF wireless signals to baseband signals which are processed by the baseband chip 250. Each of the transmission circuit 230 and the reception circuit 240 may also contain multiple hardware devices to perform radio frequency conversion. For example, a mixer may be used to multiply the baseband signals with a carrier oscillated in the radio frequency of the wireless technology in use, wherein the radio frequency may be 900 MHz, 2100 MHz, 2.6 GHz, or others utilized in LTE/LTE-A/TD-LTE technology.

The storage unit 270 may be a memory (e.g., Random Access Memory (RAM), Flash memory, or Non-Volatile Random Access Memory (NVRAM), etc.), a magnetic storage device (e.g., magnetic tap or hard disk), an optical storage device (e.g., Compact Disc Read-Only Memory (CD-ROM)), or any combination thereof for storing data, including instruction sets, program code, and user data, etc.

The processing unit 260 may be a Micro Control Unit (MCU), a general-purpose processor, a Digital Signal Processor (DSP), an application processor, or the like, which is responsible for loading and executing program code and/or instruction sets from the storage unit 270 to control the operation of the baseband chip 250 for performing the method of the present invention.

In another embodiment, the processing unit 260 and the storage unit 270 may be incorporated into the baseband chip 250 using the technique of micro-fabrication, such as the Micro-Electro-Mechanical System (MEMS) technique, and the invention is not limited thereto.

Although not shown, the mobile communication device 200 may further comprise other functional units, such as a display device (e.g., a screen, a panel, or a touch panel), an Input and Output (I/O) device (e.g., a mouse, a keyboard, a video camera, a microphone, a speaker, and/or a touch pad), a connection interface for coupling with a subscriber identity card (e.g., a Subscriber Identity Module (SIM) card, a Universal SIM (USIM) card, a Removable User Identity Module (R-UIM) card, or a CDMA SIM (CSIM) card), and so on.

Figure 3:
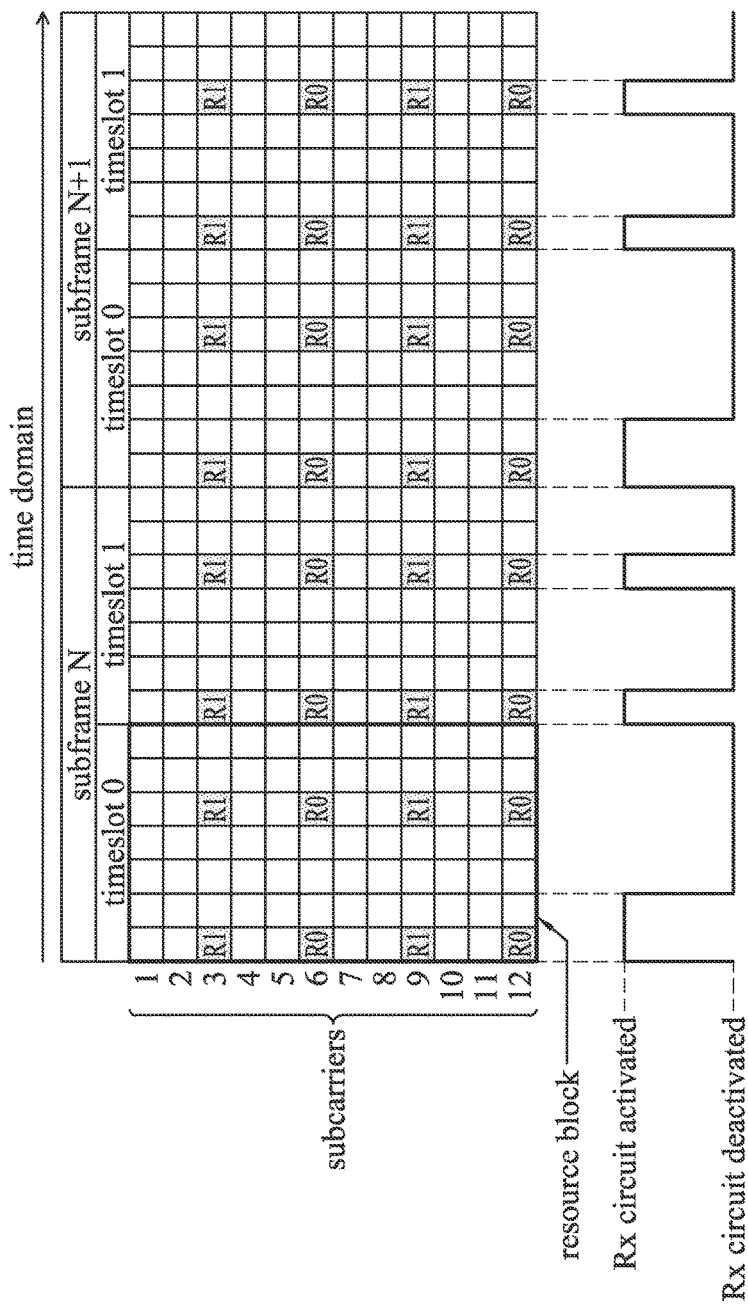
FIG. 3 is a schematic diagram illustrating an exemplary resource grid having CRS symbols for LTE downlink reception with reception circuit deactivation according to an embodiment of the invention.

FIG. 3 is a schematic diagram illustrating an exemplary resource grid having CRS symbols for LTE downlink reception with nano-Rx-deactivation according to an embodiment of the invention. The downlink reception refers to wireless reception from an Evolved Node-B (eNB) to the mobile communication device 200. That is, the downlink reception refers to wireless transmission at the eNB and wireless reception at the mobile communication device 200. In the resource grid, each resource block comprises 12 contiguous subcarriers (denoted in the vertical dimension) and 7 OFDM symbols (denoted in the horizontal dimension), and each resource block corresponds to a 0.5-millisecond timeslot, wherein 2 contiguous timeslots form an LTE subframe. The downlink Control Channel (CCH) is used to carry CCH data, which includes scheduling information for the mobile communication device 200, using the first 1, 2, 3, or 4 OFDM symbols of each 1-millisecond subframe, wherein the number of OFDM symbols used to carry CCH data is determined based on the Physical Control Format Indicator Channel (PCFICH) data. In this embodiment, the CCH data occupies the first 2 OFDM symbols of subframe N, but the invention is not limited thereto. The traffic data may be transmitted in the remaining OFDM symbols, and the OFDM symbols used to carry the traffic data may be called traffic data symbols.

As shown in FIG. 3, the RS symbols are transmitted in the first and fifth OFDM symbols of each timeslot, wherein the RS symbols specifically are CRS symbols. That is, the OFDM symbols numbered 0, 4, 7 and 11 (starting from the left) in each subframe contain RS symbols (denoted with "R1" and "R0"). Thus, the mobile communication device 200 will have finished demodulating and decoding the CCH data and will know whether it is scheduled to receive traffic data in the current subframe.

If traffic data is scheduled for the mobile communication device 200 in the current subframe, the mobile communication device 200 may continue the wireless reception operation, and then demodulate and decode the remaining OFDM symbols in the current subframe. During the process, the RS symbols appearing in the traffic data of the current subframe are collected and incorporated into the ongoing channel estimation processes.

Otherwise, if no traffic data is scheduled for the mobile communication device 200 in the current subframe, the wireless reception operation of the mobile communication device 200 may be deactivated for a portion of the remaining symbol time periods in the current subframe to save power, while keeping the wireless reception operation of the mobile communication device 200 activated for the rest portion of the remaining symbol time periods in the current subframe to provide the estimated channel condition for the next subframe. The deactivation of the wireless reception operation is hereinafter referred to as "nano-Rx-deactivation".

Specifically, the portion of the time interval for nano-Rx-deactivation and the remaining portion of the time interval may each comprise one or more discontinuous fractions of time periods. Referring back to FIG. 3, in each subframe, the mobile communication device 200 activates the reception circuit 240 for the first 2 symbol time periods to receive the CCH data. Assuming that there's no traffic data scheduled for the mobile communication device 200, the mobile communication device 200 deactivates the reception circuit 240 for the remaining symbol time periods in the current subframe, except for the symbol time periods where 2 RS symbols are to be received in the next timeslot of the current subframe.

However, in another embodiment for FIG. 3, if there's traffic data scheduled for the mobile communication device 200 in the current subframe, nano-Rx-deactivation may not be applied and the reception circuit 240 may be activated for the remaining symbol time periods for receiving the traffic data symbols.

Figure 4:
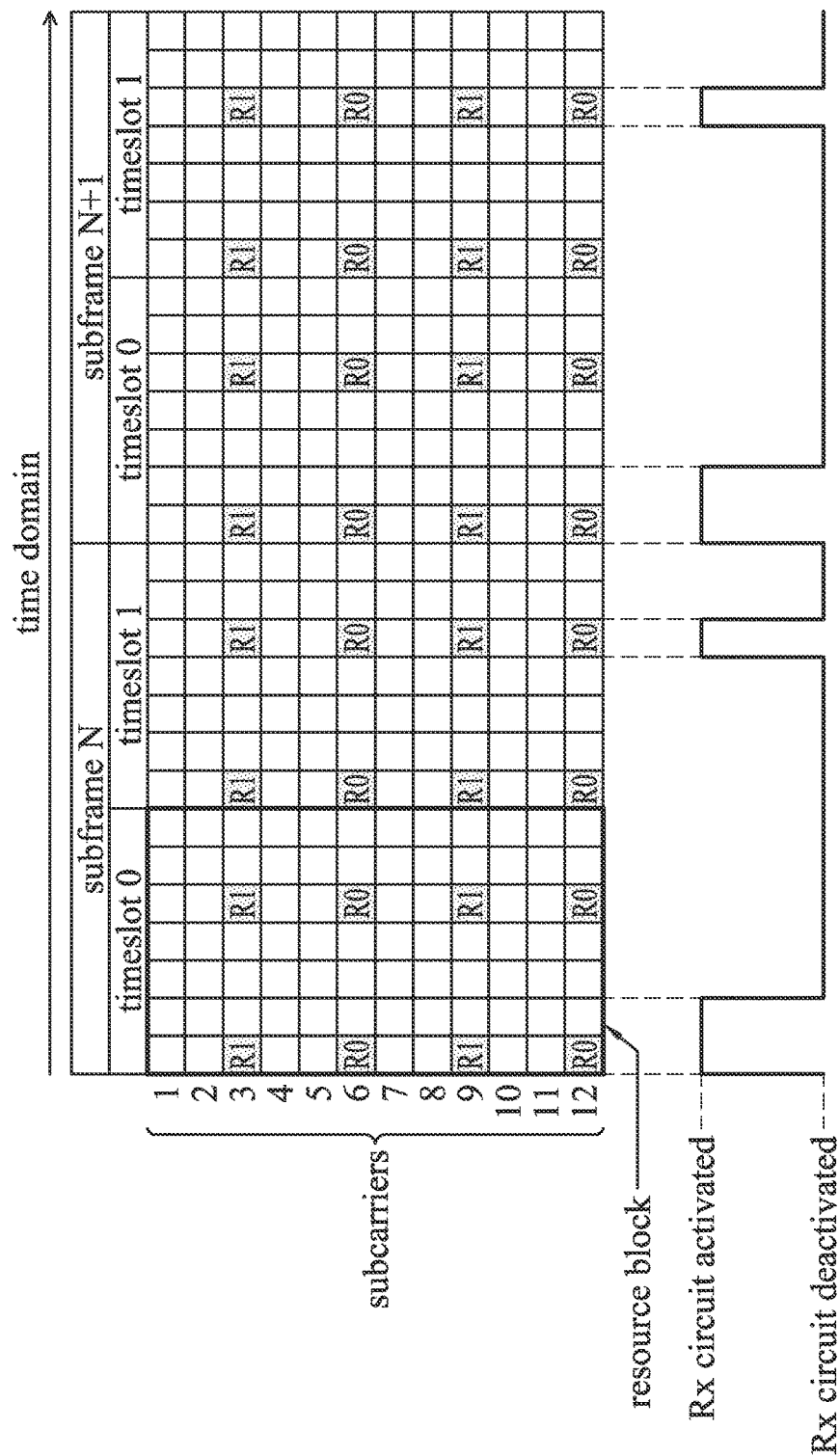
FIG. 4 is a schematic diagram illustrating an exemplary resource grid having CRS symbols for LTE downlink reception with reception circuit deactivation according to another embodiment of the invention.

FIG. 4 is a schematic diagram illustrating an exemplary resource grid having CRS symbols for LTE downlink reception with nano-Rx-deactivation according to another embodiment of the invention. The exemplary resource grid is arranged like the embodiment of FIG. 3, and thus, the related description is not repeated here for brevity. As shown in FIG. 4, in each subframe, the mobile communication device 200 activates the reception circuit 240 for the first 2 symbol time periods to receive the CCH data. Alternatively, the OFDM symbols used to carry CCH data may be the first 1, 2, or 3 OFDM symbols and the number of the OFDM symbols is determined based on the Physical Control Format Indicator Channel (PCFICH) data. Assuming that there's no traffic data scheduled for the mobile communication device 200, the mobile communication device 200 deactivates the reception circuit 240 for the remaining symbol time periods in the current subframe, except for the symbol time period where the second RS symbol is to be received in the next timeslot of the current subframe.

Alternatively, the mobile communication device 200 may deactivate the reception circuit 240 for the remaining symbol time periods in the current subframe, except for the symbol time period where the first RS symbol is to be received in the next timeslot of the current subframe.

However, in another embodiment, if there's traffic data scheduled for the mobile communication device 200 in the current subframe, nano-Rx-deactivation may still be applied but only for the symbol time period where the first RS symbol is to be received in the second timeslot of the current subframe, and the reception circuit 240 may be activated for the remaining symbol time periods for receiving the traffic data.

Figure 5:
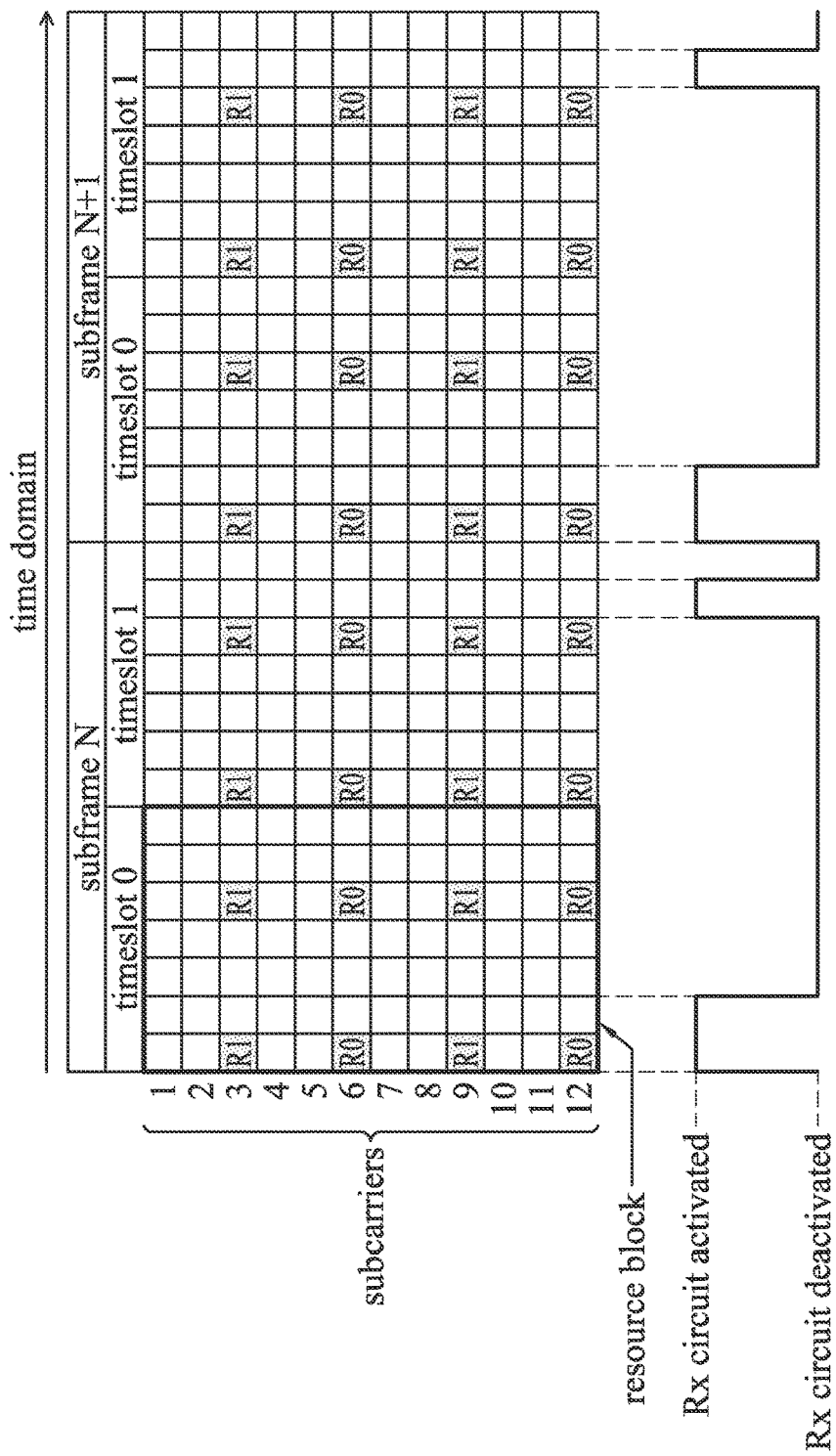
FIG. 5 is a schematic diagram illustrating an exemplary resource grid having CRS symbols for LTE downlink reception with reception circuit deactivation according to yet another embodiment of the invention.

FIG. 5 is a schematic diagram illustrating an exemplary resource grid having CRS symbols for LTE downlink reception with nano-Rx-deactivation according to yet another embodiment of the invention. The exemplary resource grid is arranged like the embodiment of FIG. 3, and thus, the related description is not repeated here for brevity. As shown in FIG. 5, in each subframe, the mobile communication device 200 activates the reception circuit 240 for the first 2 symbol time periods to receive the CCH data. Alternatively, the OFDM symbols used to carry CCH data may be the first 1, 2, or 3 OFDM symbols and the number of the OFDM symbols is determined based on the Physical Control Format Indicator Channel (PCFICH) data. Assuming that there's traffic data scheduled for the mobile communication device 200, the mobile communication device 200 deactivates the reception circuit 240 for the remaining symbol time periods in the current subframe, except for the symbol time period where the traffic data symbol subsequent to the second RS symbol is to be received in the next timeslot of the current subframe. Alternatively, even if there's no traffic data scheduled for the mobile communication device 200, the mobile communication device 200 may also deactivate the reception circuit 240 for parts of the remaining symbol time periods in the current subframe and activate the reception circuit 240 for measuring interference/noise for other parts of the remaining symbol time periods in the current subframe.

Please note that, although there's traffic data schedule for the mobile communication device 200, the mobile communication device 200 can still deactivate the reception circuit 240 for parts of the traffic data durations due to that eNB may employ repetition coding of a high factor value for encoding the traffic data symbols. Thus, skipping the reception of some traffic data symbols at the mobile communication device 200 will not cause decoding failure of the traffic data for the current subframe. For example, due to rate matching, some traffic data symbols may simply be repetitions of other traffic data symbols and thus, the mobile communication device 200 may successfully decode the traffic data even if skipping reception of those repetitions; and due to channel coding (e.g., with 1/3 code rate), the mobile communication device 200 may successfully decode the traffic data even if skipping reception of some of the traffic data symbols.

Alternatively, the mobile communication device 200 may deactivate the reception circuit 240 for the remaining symbol time periods in the current subframe, except for any symbol time period(s) where one or more traffic data symbols are transmitted in the current subframe.

Figure 6:
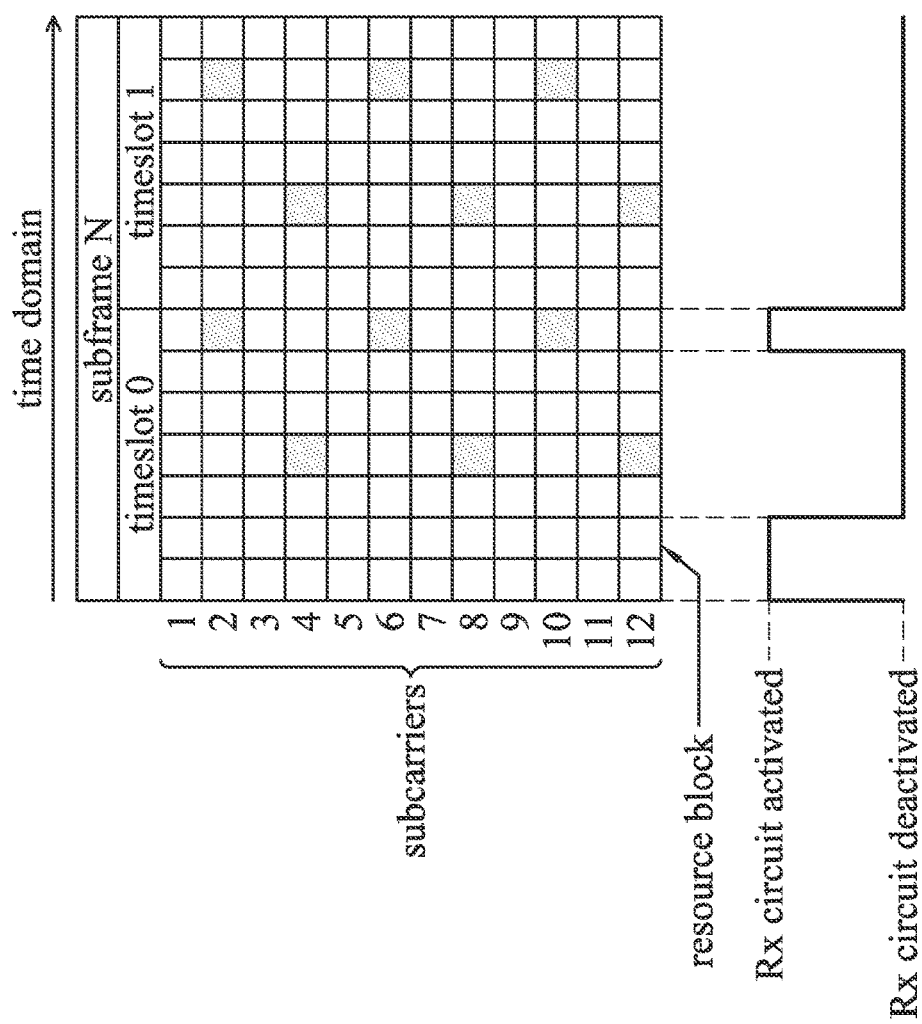
FIG. 6 is a schematic diagram illustrating an exemplary resource grid having UE-specific RS associated with PDSCH for LTE downlink reception with reception circuit deactivation according to an embodiment of the invention.
Figure 7:
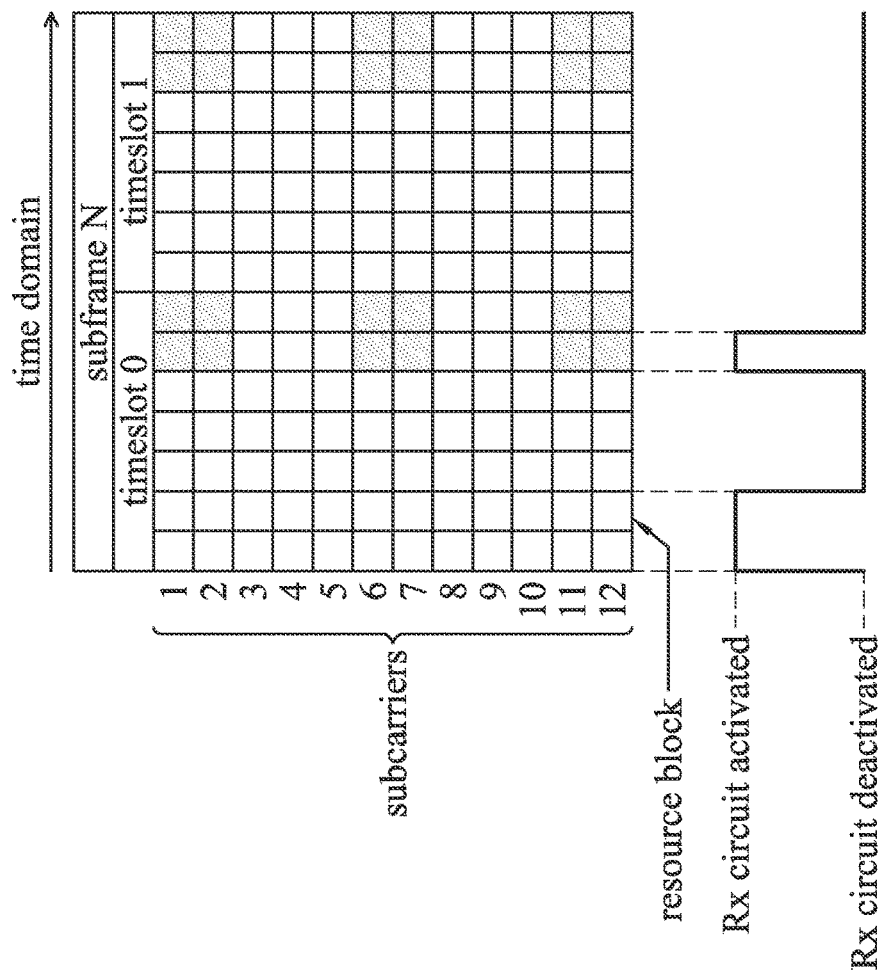
FIG. 7 is a schematic diagram illustrating an exemplary resource grid having DM RS associated with EPDCCH for LTE downlink reception with reception circuit deactivation according to an embodiment of the invention.
Figure 8:
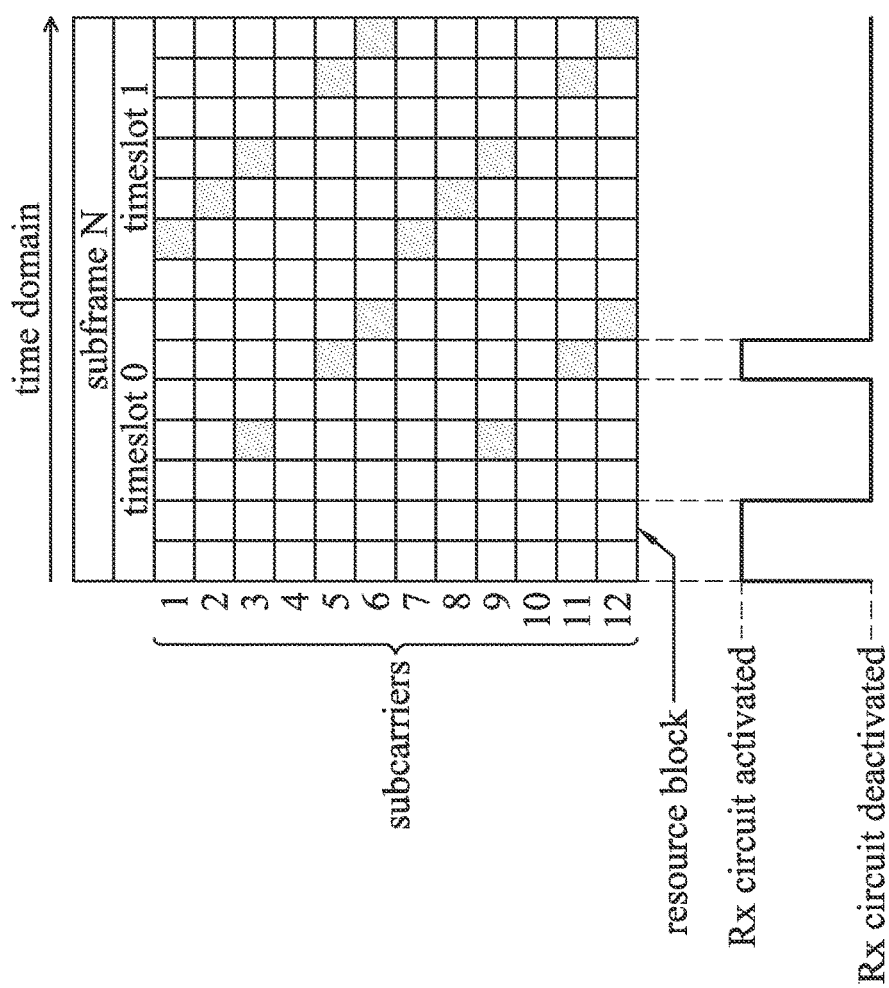
FIG. 8 is a schematic diagram illustrating an exemplary resource grid having Positioning RS symbols for LTE downlink reception with reception circuit deactivation according to an embodiment of the invention.
Figure 9:
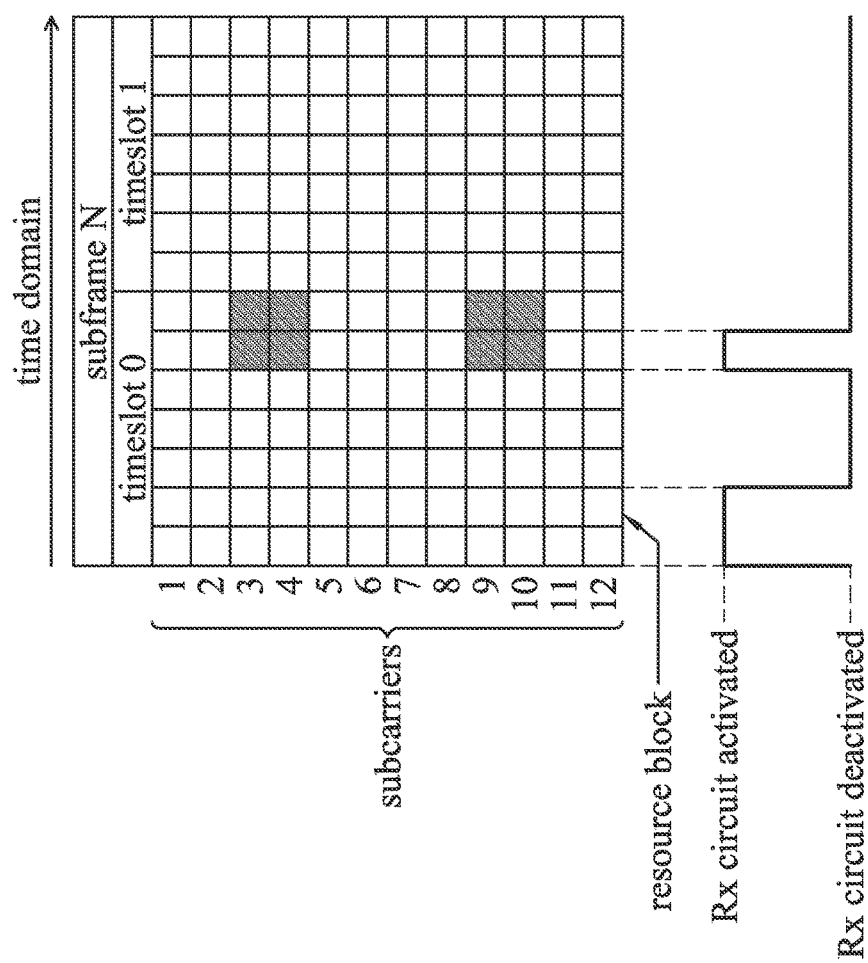
FIG. 9 is a schematic diagram illustrating an exemplary resource grid having CSI-RS symbols for LTE downlink reception with reception circuit deactivation according to an embodiment of the invention.
Figure 10:
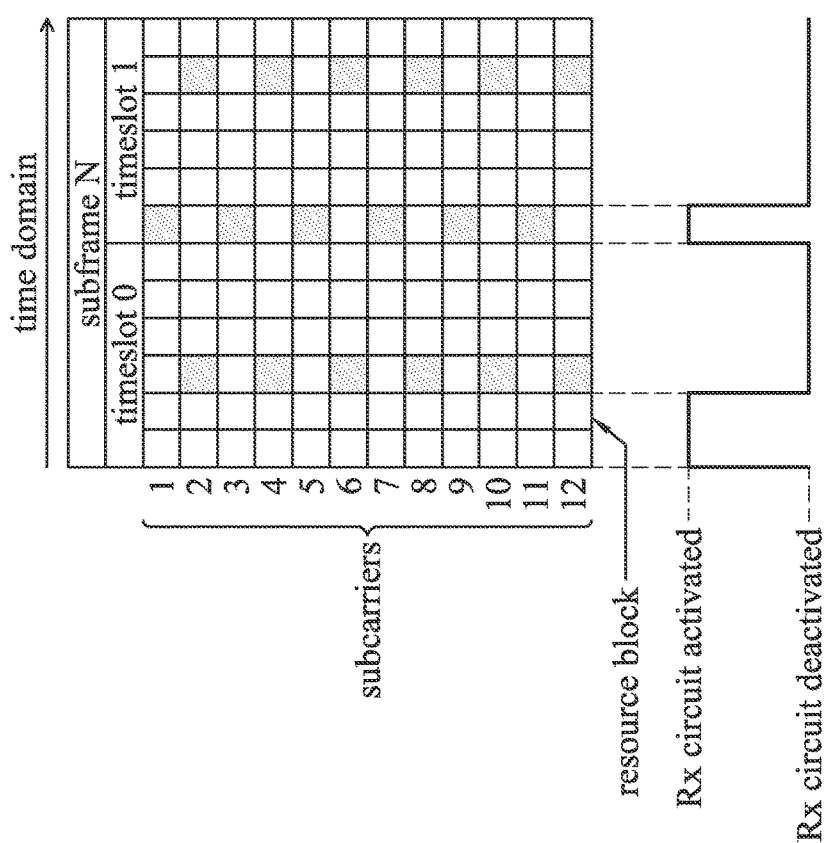
FIG. 10 is a schematic diagram illustrating an exemplary resource grid having MBSFN RS symbols for LTE downlink reception with reception circuit deactivation according to an embodiment of the invention.

Although the description of the exemplary resource grid as shown in FIGS. 3 to 5 applies to cells using the normal cyclic prefix length (i.e., each subframe includes 14 OFDM symbols), it may be modified to apply to cells using extended cyclic prefix length (i.e., each subframe includes only 12 OFDM symbols) according to the 3GPP specifications for the LTE technology. For example, when normal cyclic prefix length is used, an exemplary resource grid having CRS symbols for LTE downlink reception with nano-Rx-deactivation may refer to FIGS. 3 to 5, or an exemplary resource grid having UE-specific RS associated with PDSCH (denoted with gray background) for LTE downlink reception with nano-Rx-deactivation may refer to FIG. 6, or an exemplary resource grid having DM RS associated with EPDCCH (denoted with gray background) for LTE downlink reception with nano-Rx-deactivation may refer to FIG. 7, or an exemplary resource grid having Positioning RS symbols (denoted with gray background) for LTE downlink reception with nano-Rx-deactivation may refer to FIG. 8, or an exemplary resource grid having CSI-RS symbols (denoted with gray background) for LTE downlink reception with nano-Rx-deactivation may refer to FIG. 9. Alternatively, when normal cyclic prefix length is used, the nano-Rx-deactivation may be applied to the resource grid having any combination of the CRS, UE-specific RS associated with PDSCH, DM RS associated with EPDCCH, Positioning RS, and CSI-RS symbols according to the LTE specifications, and the invention cannot be limited thereto. On the other hand, when extended cyclic prefix length is used, an exemplary resource grid having MBSFN RS symbols (denoted with gray background) for LTE downlink reception with nano-Rx-deactivation may refer to FIG. 10, and the extended cyclic prefix length may be applied to the resource grid having any combination of the CRS, UE-specific RS associated with PDSCH, DM RS associated with EPDCCH, Positioning RS, and CSI-RS symbols according to the LTE specifications, and the invention cannot be limited thereto.

Figure 11:
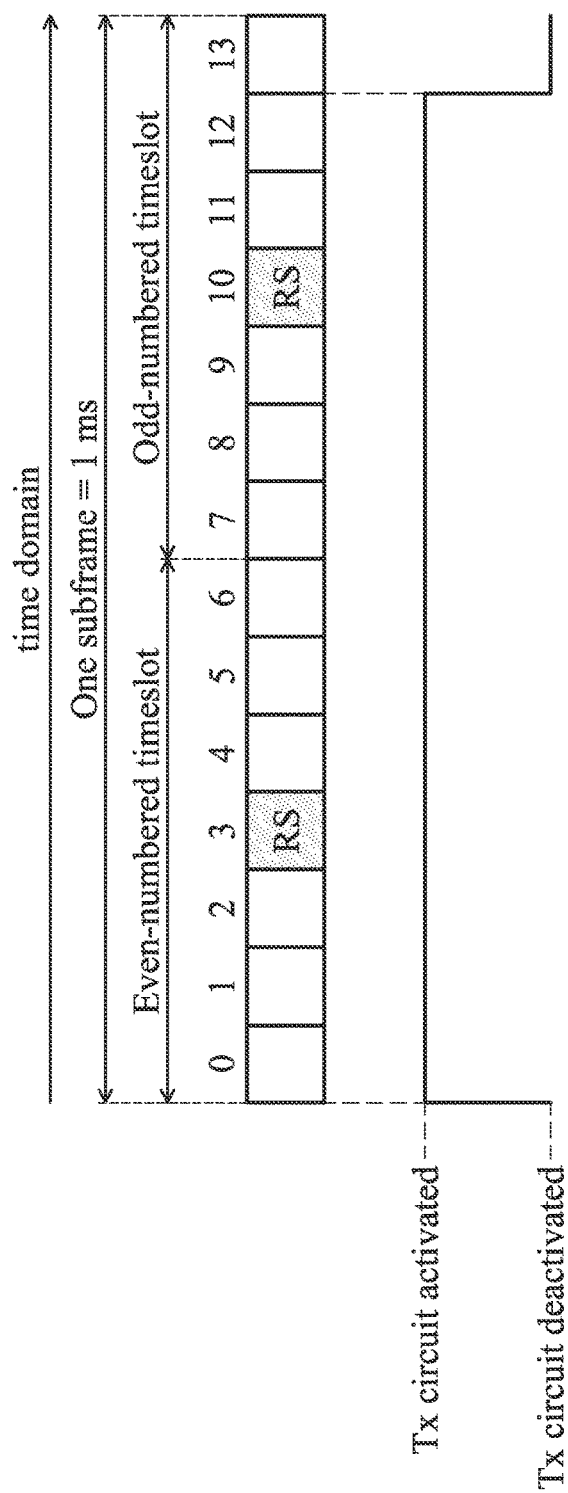
FIG. 11 is a schematic diagram illustrating an exemplary resource grid for LTE uplink transmission with transmission circuit deactivation according to an embodiment of the invention.
Figure 12:
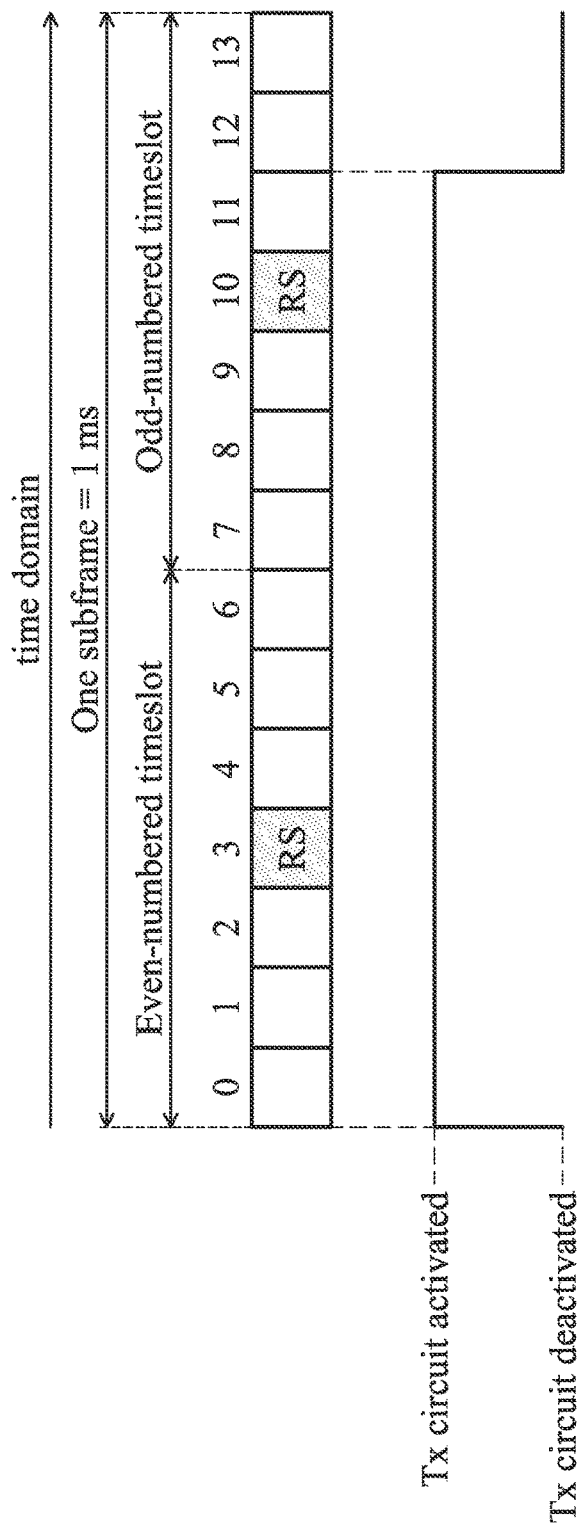
FIG. 12 is a schematic diagram illustrating an exemplary resource grid for LTE uplink transmission with transmission circuit deactivation according to another embodiment of the invention.
Figure 13:
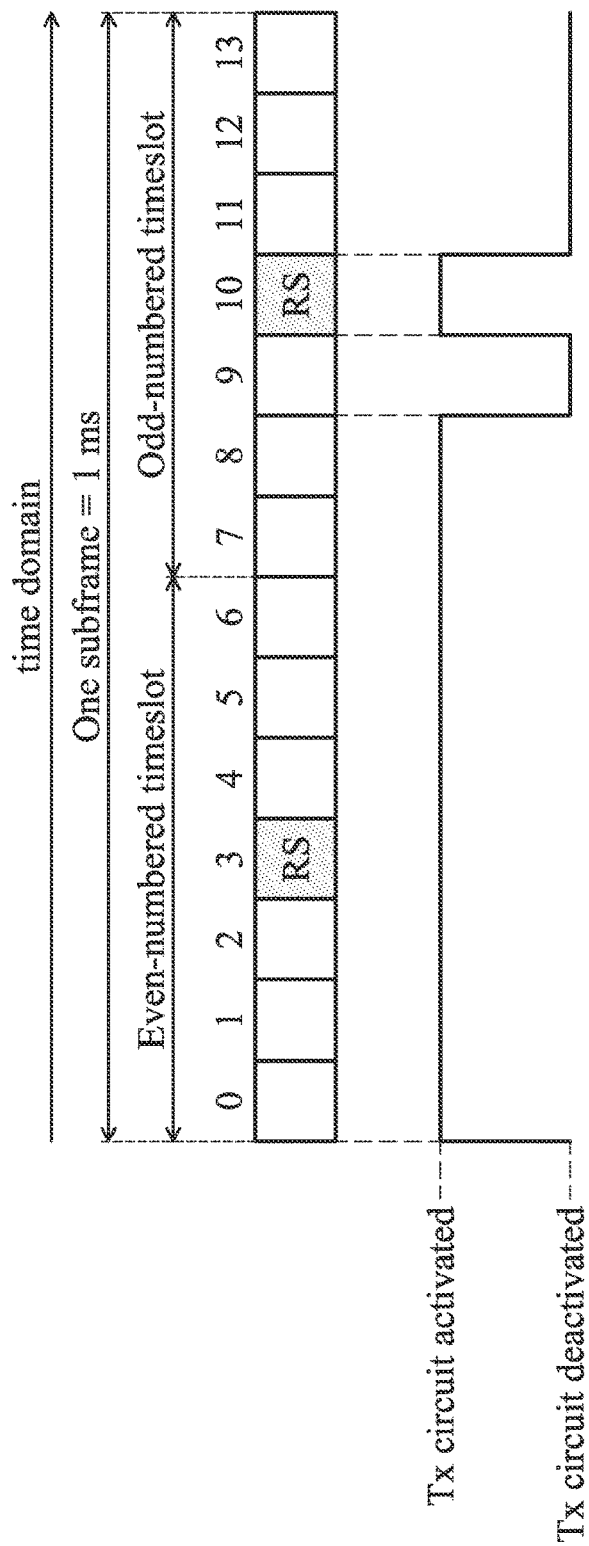
FIG. 13 is a schematic diagram illustrating an exemplary resource grid for LTE uplink transmission with transmission circuit deactivation according to yet another embodiment of the invention.

FIGS. 11 to 13 are schematic diagrams illustrating an exemplary resource grid for LTE uplink transmission with nano-Tx-deactivation according to three embodiments of the invention. The uplink transmission refers to wireless transmission from the mobile communication device 200 to the eNB. That is, the uplink transmission refers to wireless transmission at the mobile communication device 200 and wireless reception at the eNB. In the resource grid, each resource block comprises 12 subcarriers and 7 OFDM symbols (denoted in the horizontal dimension), and each resource block corresponds to a 0.5-millisecond timeslot, wherein 2 contiguous timeslots form an LTE subframe. An RS symbol is transmitted in the fourth OFDM symbol of each timeslot. That is, the OFDM symbols numbered 3 and 10 (starting from the left) in each subframe contain RS symbols (denoted with "RS"). The traffic data may be transmitted in the remaining OFDM symbols, and the OFDM symbols used to carry the traffic data may be called traffic data symbols. Although the description of the exemplary resource grid as shown in FIGS. 11 to 13 applies to cells using the normal cyclic prefix length (i.e., each subframe includes 14 OFDM symbols), it may be modified to apply to cells using extended cyclic prefix length (i.e., each subframe includes only 12 OFDM symbols) according to the 3GPP specifications for the LTE technology. In one embodiment, the RS symbols may specifically refer to DM RS for Physical Uplink Shared Channel (PUSCH).

However, to save power, the transmission of one or more traffic data symbols may be skipped due to the fact that repetition coding of a high factor value may be employed by the mobile communication device 200 to encode the traffic data symbols. Thus, skipping the transmission of some traffic data symbols at the mobile communication device 200 will not cause decoding failure of the traffic data transmitted in the subframe at the eNB. For example, due to rate matching, some traffic data symbols may simply be repetitions of other traffic data symbols and thus, the eNB may successfully decode the traffic data even if transmission of those repetitions is skipped by the mobile communication device 200; and due to channel coding (e.g., with 1/3 code rate), the eNB may successfully decode the traffic data even if transmission of some of the traffic data symbols is skipped by the mobile communication device 200. The deactivation of the wireless transmission operation is hereinafter referred to as "nano-Tx-deactivation". Specifically, the portion of the time interval for nano-Tx-deactivation may comprise one or more discontinuous fractions of time periods.

Referring to FIG. 11, in the subframe, the mobile communication device 200 activates the transmission circuit 230 for the first 13 symbol time periods to transmit the traffic data symbols and the RS symbols. Specifically, the symbol time periods numbered 0~2, 4~9, and 11~12 are used to transmit the traffic data symbols, and the symbol time periods numbered 3 and 10 are used to transmit the RS symbols. Subsequently, the mobile communication device 200 deactivates the transmission circuit 230 for the last symbol time period in the subframe to save power.

Referring to FIG. 12, in the subframe, the mobile communication device 200 activates the transmission circuit 230 for the first 12 symbol time periods to transmit the traffic data symbols and the RS symbols. Specifically, the symbol time periods numbered 0~2, 4~9, and 11 are used to transmit the traffic data symbols, and the symbol time periods numbered 3 and 10 are used to transmit the RS symbols. Subsequently, the mobile communication device 200 deactivates the transmission circuit 230 for the last 2 symbol time periods in the subframe to save power.

Referring to FIG. 13, in the subframe, the mobile communication device 200 activates the transmission circuit 230 for the first 11 symbol time periods, except for the tenth symbol time period, to transmit the traffic data symbols and the RS symbols. Specifically, the symbol time periods numbered 0~2 and 4~8 are used to transmit the traffic data symbols, and the symbol time periods numbered 3 and 10 are used to transmit the RS symbols. Meanwhile, the transmission circuit 230 is deactivated for the tenth symbol time period to save power. In addition, the mobile communication device 200 further deactivates the transmission circuit 230 for the last 3 symbol time periods in the subframe to save power.

Although not shown, in the embodiments of FIGS. 11 to 13, the mobile communication device 200 may further determines whether a Sounding Reference Signal (SRS) is to be transmitted in the subframe, and if so, the transmission circuit 230 may not be deactivated for the symbol time period for the SRS transmission. That is, the portion of the time interval for nano-Tx-deactivation may not comprise the symbol time period for SRS transmission. According to the LTE specifications, an SRS may be transmitted in the last symbol time period, but it is also possible to transmit the SRS in another symbol time period.

Figure 14:
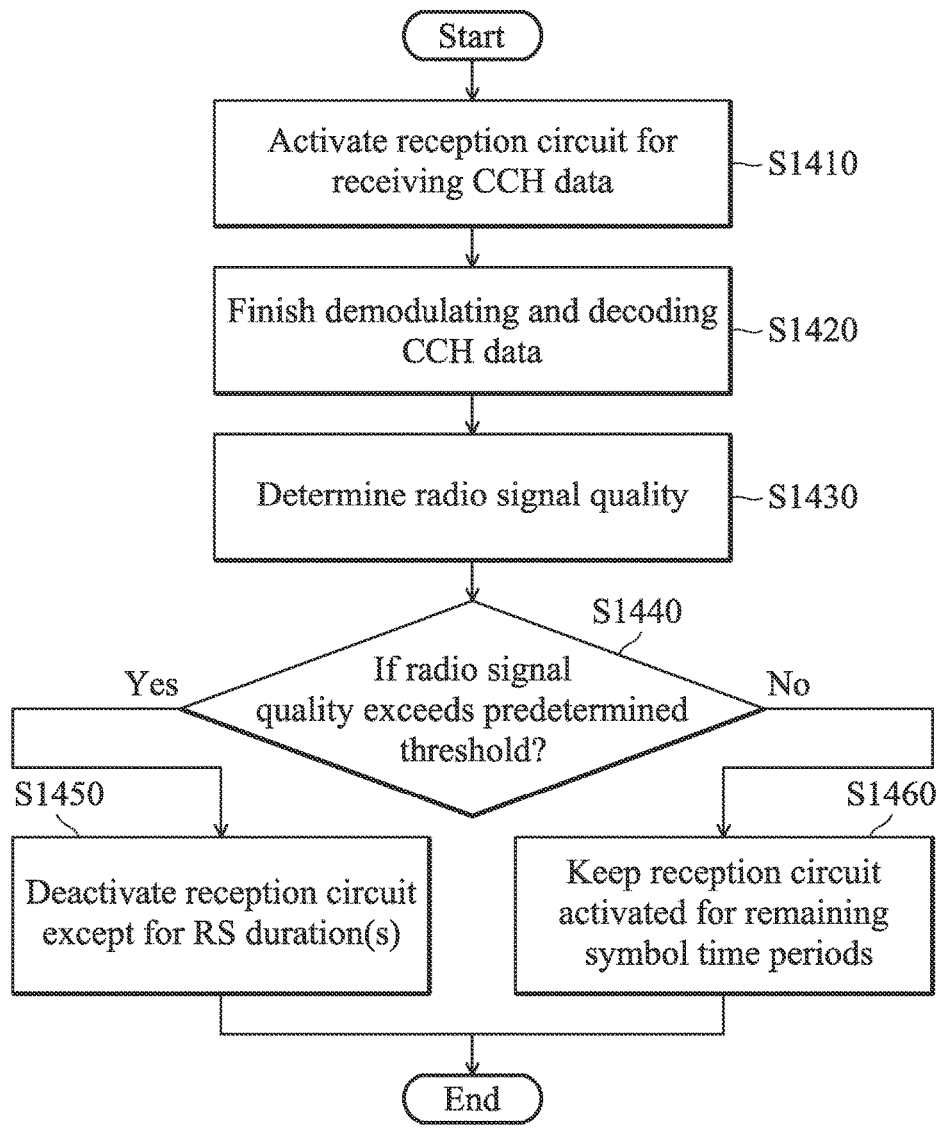
FIG. 14 is a flow chart illustrating the method for controlling wireless reception according to an embodiment of the invention.

FIG. 14 is a flow chart illustrating the method for controlling wireless reception according to an embodiment of the invention. In this embodiment, the method is executed by a mobile communication device comprising a reception circuit for receiving wireless signals. For example, the method may be executed by the mobile communication device 200. To begin, the mobile communication device activates the reception circuit for receiving CCH data (step S1410). Specifically, the CCH data may be received in the first 1, 2, 3, or 4 symbol time periods of an LTE subframe according to the Physical Control Format Indicator Channel (PCFICH) data. After receiving complete CCH data, the mobile communication device demodulates and decodes the CCH data (step S1420). Subsequently, the mobile communication device determines the radio signal quality according to the demodulated and decoded CCH data or the RS symbol(s) received during the receiving of the CCH data (step S1430). The radio signal quality may refer to a Signal to Noise Ratio (SNR), a Signal to Interference-plus-Noise Ratio (SINR), a Reference Signal Receiving Power (RSRP), a Reference Signal Received Quality (RSRQ), a Radio Link Quality (RLQ), a Received Signal Strength Indication (RSSI), a Channel Quality Indicator (CQI), or another.

Next, the mobile communication device determines whether the radio signal quality exceeds a predetermined threshold (step S1440), and if so, deactivates the reception circuit for the remaining symbol time periods of the current subframe, except for the symbol time periods where RS symbols are to be received (step S1450). Otherwise, if the radio signal quality does not exceed the predetermined threshold, the mobile communication device keeps the reception circuit activated for the remaining symbol time periods of the current subframe (step S1460). In another embodiment for step S1450, the mobile communication device may deactivate the reception circuit for the remaining symbol time periods of the current subframe, except for the symbol time periods where non-RS symbols (e.g., symbols for carrying traffic data or others) are to be received.

Alternatively, the mobile communication device may replace the radio signal quality with a traffic load indicator for steps S1430 and S1440.

Figure 15:
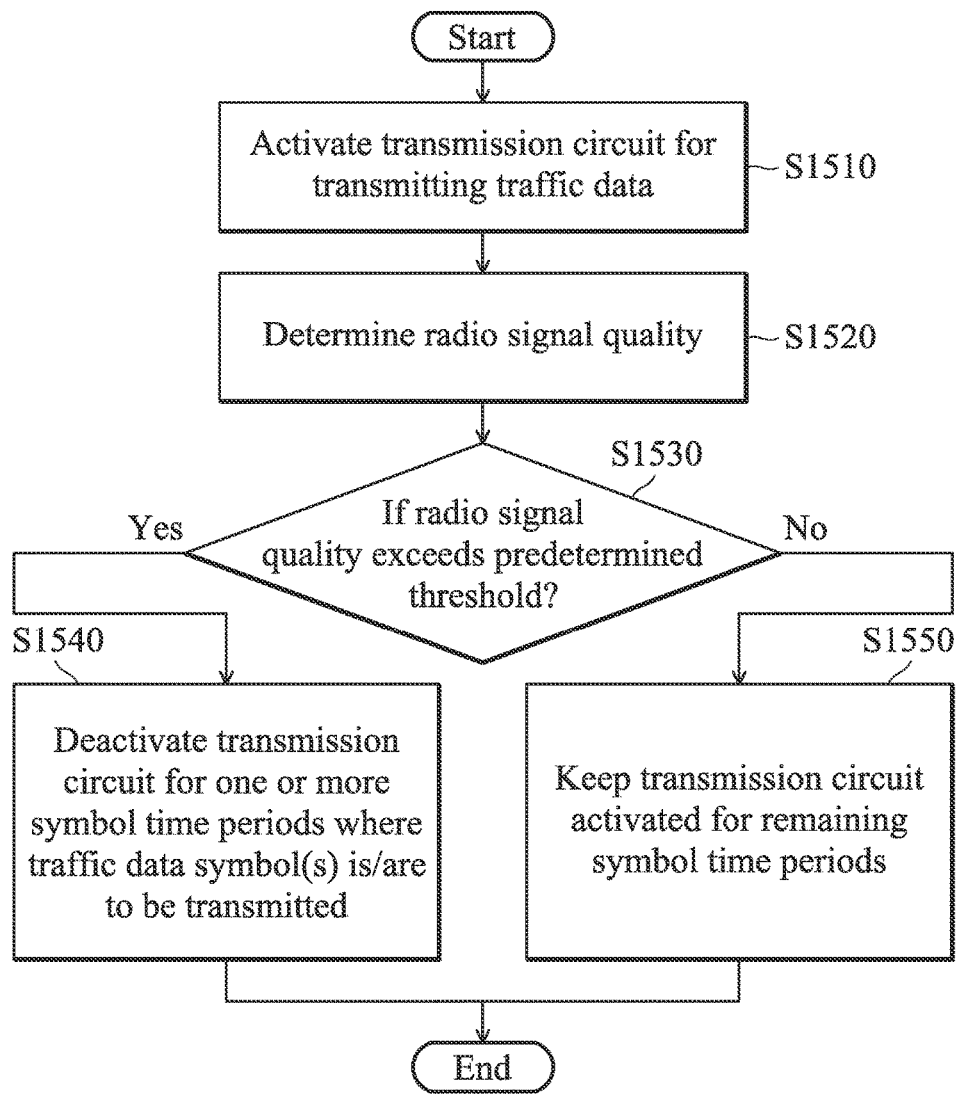
FIG. 15 is a flow chart illustrating the method for controlling wireless transmission according to an embodiment of the invention.

FIG. 15 is a flow chart illustrating the method for controlling wireless transmission according to an embodiment of the invention. In this embodiment, the method is executed by a mobile communication device comprising a transmission circuit for transmitting wireless signals. For example, the method may be executed by the mobile communication device 200. To begin, the mobile communication device activates the transmission circuit for transmitting traffic data (step S1510). Next, the mobile communication device determines the radio signal quality with regard to the transmission of the traffic data (step S1520). The radio signal quality may refer to an SNR, an SINR, an RSRP, an RSRQ, an RLQ, an RSSI, a CQI, or another.

Subsequently, the mobile communication device determines whether the radio signal quality exceeds a predetermined threshold (step S1530), and if so, deactivates the transmission circuit for one or more symbol time periods of the current subframe, where traffic data symbol(s) is/are to be transmitted (i.e., deactivates the transmission circuit for any one or more symbol time periods except the symbol time periods where DM-RS(s) and SRS are to be transmitted) (step S1540). Otherwise, if the radio signal quality does not exceed the predetermined threshold, the mobile communication device keeps the transmission circuit activated for the remaining symbol time periods of the current subframe (step S1550).

Alternatively, the mobile communication device may replace the radio signal quality with a traffic load indicator for steps S1520 and S1530.

Please note that, the methods for controlling wireless reception and transmission may be applied to the Frequency Division Duplex (FDD)-LTE and Time Division (TD)-LTE technologies. Particularly, in the TD-LTE technology, a so-called "special subframe" may be employed in which part of the subframe may be used for uplink transmission and part of the subframe may be used for downlink reception. That is, unlike a normal subframe in which only Tx or Rx operation is configured, both the Tx operation and Rx operation may be interlaced within a special subframe. For the special subframe, the method for controlling wireless reception may be applied to the Rx part of the subframe, and the method for controlling wireless transmission may be applied to the Tx part of the subframe.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile communication device, comprising:
   a transmission circuit, configured to transmit wireless signals; and
   a processor, configured to activate the transmission circuit for a portion of an uplink time interval for transmitting traffic data, determine a radio signal quality with regard to the transmission of the traffic data, and deactivate the transmission circuit for the remaining portion of the uplink time interval when the radio signal quality exceeds a predetermined threshold,
   wherein the remaining portion comprises one or more traffic data symbols of the uplink time interval.

2. The mobile communication device of claim 1, wherein the uplink time interval is a Long Term Evolution (LTE) subframe.

3. The mobile communication device of claim 1, wherein the processor further determines whether a Reference Signal (RS) symbol or a Sounding Reference Signal (SRS) is to be transmitted in the uplink time interval, and the remaining portion does not comprise a symbol time period for the RS or SRS transmission.

4. The mobile communication device of claim 1, wherein the processor further keeps the transmission circuit activated for transmitting the traffic data when the radio signal quality does not exceed the predetermined threshold.

5. The mobile communication device of claim 1, wherein the radio signal quality comprises at least one of the following:
   a Signal to Noise Ratio (SNR);
   a Signal to Interference-plus-Noise Ratio (SINR);
   a Reference Signal Receiving Power (RSRP);
   a Reference Signal Received Quality (RSRQ);
   a Radio Link Quality (RLQ);
   a Received Signal Strength Indication (RSSI); and
   a Channel Quality Indicator (CQI).

6. A method for controlling wireless transmission, executed by a mobile communication device comprising a transmission circuit for transmitting wireless signals, the method comprising:
   activating the transmission circuit for a portion of an uplink time interval for transmitting traffic data;
   determining a radio signal quality with regard to the transmission of the traffic data; and
   deactivating the transmission circuit for the remaining portion of the uplink time interval when the radio signal quality exceeds a predetermined threshold,
   wherein the remaining portion comprises one or more traffic data symbols of the uplink time interval.

7. The method of claim 6, wherein the uplink time interval is a Long Term Evolution (LTE) subframe.

8. The method of claim 6, further comprising:
determining whether a Reference Signal (RS) symbol or a Sounding Reference Signal (SRS) is to be transmitted in the uplink time interval,
wherein the remaining portion does not comprise a symbol time period for the RS or SRS transmission.

9. The method of claim 6, further comprising:
keeping the transmission circuit activated for transmitting the traffic data when the radio signal quality does not exceed the predetermined threshold.

10. The method of claim 6, wherein the radio signal quality comprises at least one of the following:
- a Signal to Noise Ratio (SNR);
- a Signal to Interference-plus-Noise Ratio (SINR);
- a Reference Signal Receiving Power (RSRP);
- a Reference Signal Received Quality (RSRQ);
- a Radio Link Quality (RLQ);
- a Received Signal Strength Indication (RSSI); and
- a Channel Quality Indicator (CQI).

* * * * *